US009836516B2

(12) United States Patent
Quakkelaar et al.

(10) Patent No.: US 9,836,516 B2
(45) Date of Patent: Dec. 5, 2017

(54) PARALLEL SCANNERS FOR LOG BASED REPLICATION

(71) Applicants:Rene Quakkelaar, Ter Aar (NL); Rene Siles, San Francisco, CA (US); Elena Lora, Paris (FR)

(72) Inventors: Rene Quakkelaar, Ter Aar (NL); Rene Siles, San Francisco, CA (US); Elena Lora, Paris (FR)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 14/171,390

(22) Filed: Feb. 3, 2014

(65) Prior Publication Data

US 2015/0112934 A1    Apr. 23, 2015

Related U.S. Application Data

(60) Provisional application No. 61/893,002, filed on Oct. 18, 2013.

(51) Int. Cl.
*G06F 17/30* (2006.01)
(52) U.S. Cl.
CPC ............... *G06F 17/30575* (2013.01)
(58) Field of Classification Search
CPC ............ G06F 17/30575; G06F 17/30174
USPC ................................. 707/633, 634
See application file for complete search history.

(56) References Cited

U.S. PATENT DOCUMENTS

| | | | |
|---|---|---|---|
| 7,801,851 B2 | 9/2010 | Holenstein et al. | |
| 8,024,294 B2 | 9/2011 | Kottomtharayil | |
| 8,086,566 B2 | 12/2011 | Edlund et al. | |
| 8,121,978 B2 | 2/2012 | Wiss et al. | |
| 8,412,674 B2 | 4/2013 | Zhu et al. | |
| 8,510,270 B2 | 8/2013 | Pareek et al. | |
| 8,626,709 B2 | 1/2014 | Isaacson et al. | |
| 8,868,506 B1 * | 10/2014 | Bhargava | G06F 17/30011 707/648 |
| 9,652,485 B1 * | 5/2017 | Bhargava | G06F 17/30356 707/707 |
| 2003/0208511 A1 | 11/2003 | Earl et al. | |

(Continued)

OTHER PUBLICATIONS

Bishal A Caregaonkar, "WebSphere Application Server Top 10 Performance Tuning Recommendations," IBM, published Dec. 15, 2011, available at https://www.ibm.com/developerworks/community/wikis/form/anonymous/api/wiki/e8958ad9-597f-4a29-8614-f3a75cee99c9/page/f09cd3cf-9515-4de6-92c7-38f11d406cf0/attachment/e6ee8e9a-3faa-4e54-b11c-90429fc0e481/media.*

(Continued)

*Primary Examiner* — Robert Beausoliel, Jr.
*Assistant Examiner* — Alexandria Bromell
(74) *Attorney, Agent, or Firm* — Sterne, Kessler, Goldstein & Fox, PLLC

(57) ABSTRACT

Log based replication using parallel scanners is described. An example method includes establishing replication paths from a primary database to a plurality of destination servers. A plurality of scanner threads are spawned to scan a transaction log of the primary database. Specifically, one scanner thread is assigned to each replication path corresponding to each destination server. For each scanner thread, data bound to a replication path associated with the scanner thread is selected from a subset of the transaction log. Accordingly, the data is distributed to a destination server associated with the replication path.

25 Claims, 6 Drawing Sheets

(56) References Cited

U.S. PATENT DOCUMENTS

| | | | |
|---|---|---|---|
| 2004/0117478 A1* | 6/2004 | Triulzi | H04L 63/1416 709/224 |
| 2006/0047713 A1 | 3/2006 | Gornshtein et al. | |
| 2007/0255763 A1 | 11/2007 | Beyerle et al. | |
| 2008/0114816 A1 | 5/2008 | Shepherd | |
| 2009/0313311 A1 | 12/2009 | Hoffmann et al. | |
| 2010/0030730 A1 | 2/2010 | Shang et al. | |
| 2010/0030824 A1* | 2/2010 | Shang | G06F 11/2097 707/707 |
| 2013/0054526 A1 | 2/2013 | Vincenzo | |
| 2013/0124464 A1 | 5/2013 | Rank et al. | |
| 2013/0159249 A1 | 6/2013 | Dewall et al. | |

OTHER PUBLICATIONS

Sybase, "New Features Bulletin, Replication Agent 15.6," published in Nov. 2010 by Sybase, pp. 1-9.*

Sybase 2, "New Features Guide, Replication Server 15.7.1," published in Apr. 2012 by Sybase, pp. 1-202.*

Bashal Caregaonkar, "WebSphere Application Server Top 10 Performance Tuning Recommendations," IBM, published Dec. 15, 2011, available at https://www.ibm.com/developerworks/community/wikis/form/anonymous/api/wiki/e8958ad9-597f-4a29-8614-f3a75cee99c9/page/f09cd3cf-9515-4de6-92c7-38f11d406cf0/attachment/e6ee8e9a-3faa-4e54-b11c-90429fc0e481/media.*

* cited by examiner

US 9,836,516 B2

PARALLEL SCANNERS FOR LOG BASED REPLICATION

BACKGROUND

In distributed database systems, data in a primary database are replicated to databases in various replicate destinations. Changes made to the primary database can frequently be recorded in a transaction log, which contains before and after images of the changed data. Replication can be achieved where an external system or component is responsible for reading from the database transaction logs and distributing the recorded changes to multiple replicate destinations via multiple replication paths.

Conventional systems implement a single scanner thread to scan the transaction log of the primary database and distribute the data to multiple replication paths. However, while the scanner thread is busy filtering and distributing data to the specific replication path, it cannot continue scanning of the transaction log. Thus, such conventional systems may incur significant performance bottleneck. The problem is exacerbated in a scenario when the number of replication destinations and paths are increased. Furthermore, due to the sequential nature of the distribution operation in a single scanner environment, the specific data modification of the primary database can only be processed and replicated after the previous data has been distributed. As a result, a single scanner cannot support for priority transactions, when the urgent data need to be processed and distributed immediately after it is generated.

Therefore, conventional systems fail to provide an ideal data replication mechanism with low performance overhead, high replication throughput and scalability.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for implementing parallel scanners for log based replication. As will be described in further detail below, embodiments can spawn as many scanner threads as replication paths are defined, where a scanner thread is assigned to a corresponding replication path. Embodiments can reduce performance bottleneck given that each scanner thread only needs to process log records for data bound to a specific replication path. Embodiments further increase scalability and afford flexibility using multiple scanner threads to read and process log records from the replication log. Embodiments can further allow one or more dedicated replication paths to work with priority transactions because the distribution of the priority data does not depend on other data already stored in the transaction log. Accordingly, embodiments provides improved performance and scalability for the replication of the primary database to multiple destination servers.

System

Figure 1:
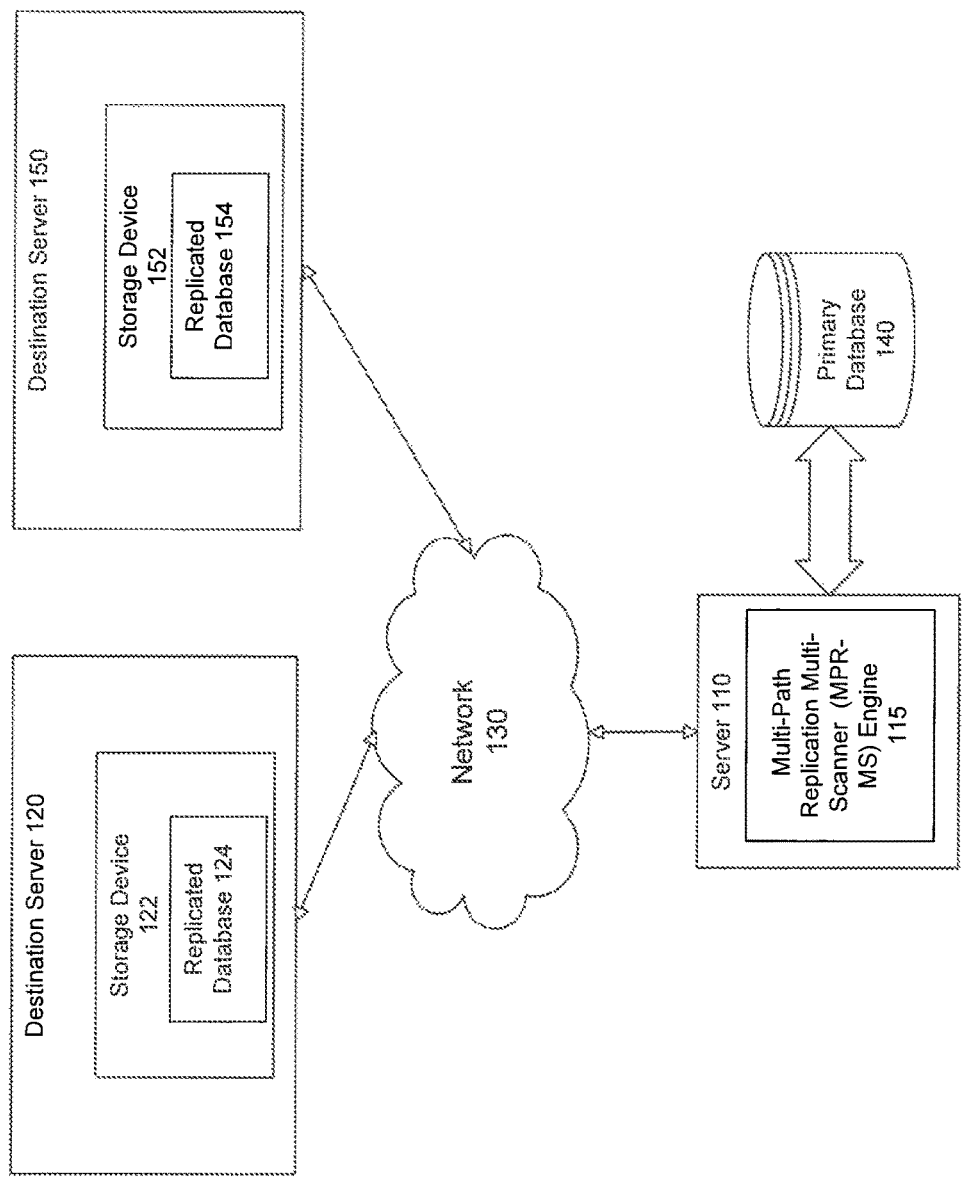
FIG. 1 illustrates a client/server system, according to an embodiment.

FIG. 1 illustrates a client/server system 100. System 100 includes a server 110, a Multi-Path Replication Multi-Scanner (MPR-MS) engine 115, destination servers 120 and 150, a network 130, and a primary database 140.

Destination servers 120 and 150 communicate with server 110 over network 130. Specifically, destination servers 120 and 150 may be connected to a Database Management System (DBMS) (not shown) on server 110 via network 130. In an embodiment, the DBMS such as SAP® Adaptive Server® Enterprise (ASE), SAP Sybase IQ, SAP Sybase SQL Anywhere (all from SAP AG) and operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat), although the invention is not limited to this example. The network 130 includes functionality for packaging client calls in the well-known Structured Query Language (SQL) together with any parameter information into a format (of one or more packets) suitable for transmission to the DBMS. Destination servers 120 and 150 may receive log records or replicated transactions from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Destination servers 120 and 150 include storage devices 122 and 152. Although only destination servers 120 and 150 are shown, more destination servers may be used as necessary. Storage devices 122 and 152, an example of which will be described in detail with respect to FIG. 6, can be any device for recording and storing information, which includes but is not limited to, flash memory, magnetic tape and optical discs.

Server 110 can host Multi-Path Replication Multi-Scanner (MPR-MS) engine 115. MPR-MS engine 115 can be software, firmware, or hardware or any combination thereof in a computing device. System 100 can be implemented on or implemented by one or more computing devices. As will be further described with respect to FIG. 6, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
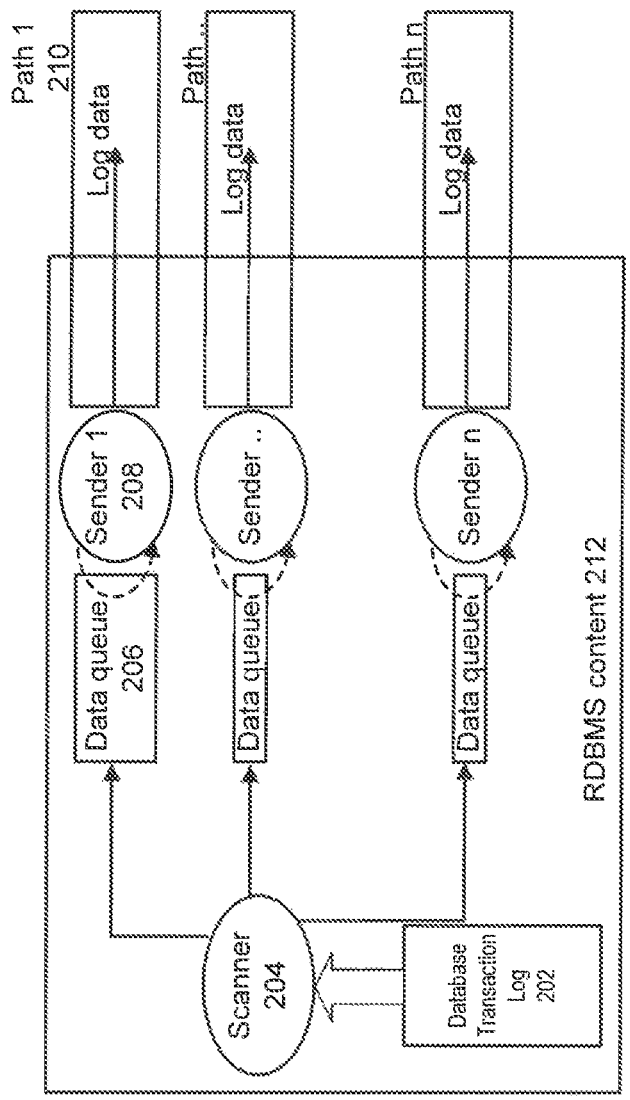
FIG. 2 depicts a data replication system with a single scanner thread, according to an embodiment.

FIG. 2 depicts a data replication system with a single scanner thread, according to an embodiment. In the example shown in FIG. 2, a Multi-Path Replication Single Scanner configuration is implemented in RDBMS content 212. In this embodiment, data changes of the primary database are captured in database transaction log 202. A single scanner 204 may read transaction log 202 and process the qualifying log records. The resulted data may be subsequently distributed to external replication systems. In another embodiment, data is distributed using a separate thread from the scanner thread. For example, sender thread 208 distributes data for a specific replication path 210. To support multiple replicate destinations from a single primary database, multiple replication paths 210 are created, where one replication path corresponds to one replicate destination.

Notably, in this embodiment, a single scanner thread 202 reads the log data and processes the qualifying log records on behalf of all replication paths. In one embodiment, scanner thread 202 filters data from transaction log based on user defined bindings created between the primary database and the multiple destinations. After processing by scanner thread 202, data may be stored in data queue 206.

In one embodiment, one data queue 206 is associated with a specific replication path 210. Sender thread 208 reads from data queue 206 and is dedicated to distributing data across the corresponding replication path 210. When all data in data queue 206 is processed, sender thread 208 sleeps. Sender thread 208 may receive a wake-up call from seamier thread 204 upon receiving new data in data queue 206 and proceed to process the data until data queue 206 is empty again.

In the single scanner configuration, scalability may be an issue because increasing the number of replication paths may result in a scenario where the single scanner thread. 202 can no longer produce enough data to keep sender thread 206 busy. As a result, sender thread may go to sleep upon data queue 206 is empty and may need wakeup calls when new data is inserted into data queue 206. Accordingly, the frequent sleeps and wakeups of sender thread 206 may cause a degradation of the overall throughput of the replication system.

In another embodiment, given the need to distribute log records to multiple replication paths 1 . . . n, there may be significant increase in the in-memory copies of the log records to transfer them to the designated data queue 206 associated with a replication path 210. Thus, the overhead of copying the same data across multiple data queues 206 may degrade performance, because scanner thread 204 is preoccupied with the copying operation and no longer available to scan transaction log 202.

In still another embodiment, the single scanner thread 202 needs to build all the object related internal structures for all replication paths 1 . . . n, such as building the schema for an object that is being replicated, and therefore may impact its ability to copy data to other data queues 206.

In still another embodiment, due to the fact that distribution of the data is performed serially or sequentially in a single scanner configuration, for specific data modifications to be distributed to a replication path 210, it is processed and replicated once the previous data has been distributed. Accordingly, a dedicated replication path to work with priority transactions may not be feasible under the single scanner configuration.

Figure 3:
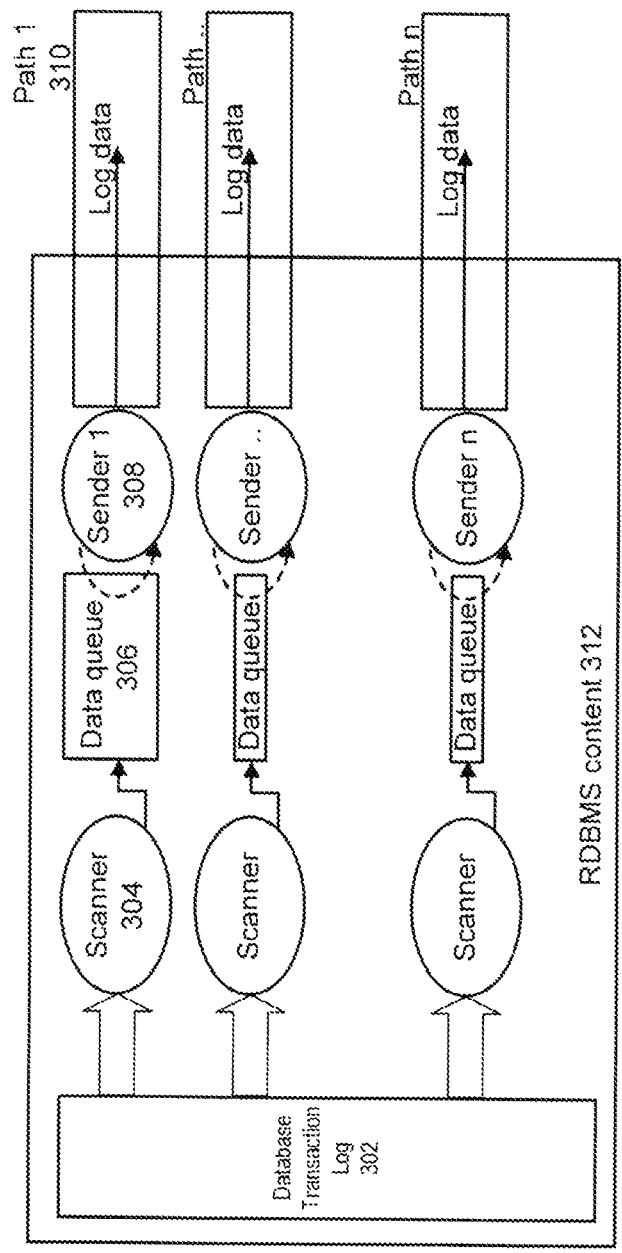
FIG. 3 depicts a data replication system with multiple scanner threads, according to an embodiment.

FIG. 3 depicts a data replication system with multiple scanner threads, according to an embodiment. In the example illustrated in FIG. 3, a Multi-Path Replication Multi-Scanner thread (MPR-MS) configuration is implemented in RDBMS content 312. In contrast with FIG. 2, multiple scanner threads 304 are created in this embodiment.

In one embodiment, one scanner thread 304 is dedicated to each replication path 310. However, it is possible that a plurality of scanner threads 304 may be dedicated to each replication path.

In another embodiment, each scanner thread 304 reads all log data in transaction log 302 and filters data and processes data only associated with the specific replication path 310 based on the bindings defined by the user.

In still another embodiment, because each sender thread 308 has its corresponding scanner thread 304, the performance of the sender thread 308 may not be affected by activity generated by other replication paths. For example, sender thread 308 may not need to sleep on empty queue, the scenario which is frequently encountered under a single scanner configuration of FIG. 2.

In still another embodiment, the performance bottleneck may be eliminated because the log data need to be distributed is no longer copied to all replication paths. In still another embodiment, given that each scanner thread 304 may only build the internal object related structures necessary to process data associated with the replication path 310, which the scanner thread is assigned to and tasked for, performance throughput may be improved further. In still another embodiment, in the event the scanner thread 304 needs to process other tasks such as performing a schema look up for a replicated object, such task may not impact the distribution of log data to other data queues 306.

In still another embodiment, one or more priority replication paths 310 may be defined to deal with priority data when data modifications are to be distributed as soon as they are generated. For example, scanner thread 34 working for the high priority replication path may skip or ignore data not associated with priority replication path 310. Thus, the data processing and distribution over priority replication path 310 may be independent from the distribution of data associated with non-priority replication paths.

Figure 4:
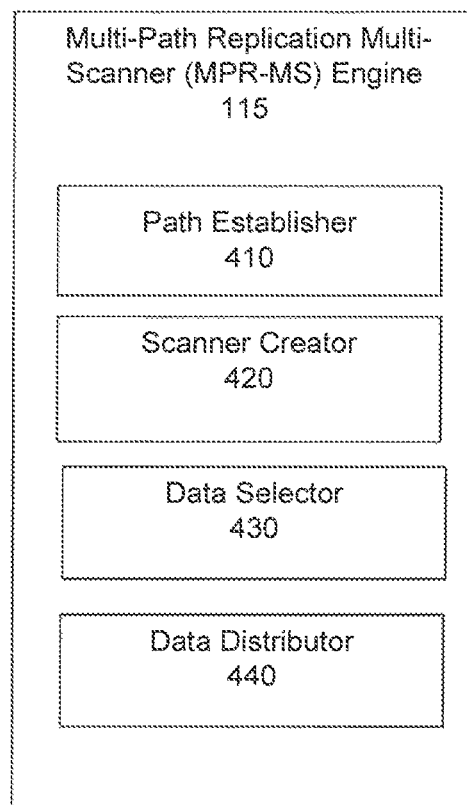
FIG. 4 illustrates elements of a Multi-Replication Path Multi-Scanner (MPR-MS) engine, according to an embodiment.

FIG. 4 illustrates elements of a Multi-Path Replication Multi-Scanner (MPR-MS) engine, according to an embodiment. In the example shown in FIG. 4, MPR-MS engine includes path establisher 410, scanner creator 420, data selector 430, and data distributor 440.

Path establisher 410 establishes replication paths from a primary database to a plurality of destination servers. In an embodiment, a replication path may be an object created representing the path from the source database to a replication destination. A replication path may involve a primary database, a plurality of scanner threads, data queues, sender threads and replication destinations. For example, a user may stipulate the topology of a data replication system and specify the number for destinations that the primary database is to be replicated to. Base on the number of the destinations provided by the user, a plurality of replication paths may be established. In an embodiment, one replication path is associated with each destination server.

In another embodiment, a default path may be reserved to distribute data that is unspecified by the user. In still another embodiment, a priority path may be defined to handle priority transactions where data modification of the primary database needs to be distributed to the replication destinations immediately.

Scanner creator 420 spawns a plurality of scanner threads that scan a transaction log of the primary database, and one scanner thread is assigned to each replication path corresponding to each destination server. As data changes of the primary database is captured in the transaction log file, under a ASE Replication Agent (ASE) configuration, a single scanner thread is responsible for scanning the transaction log, generating any control commands, such as Log Transfer Language (LTL) that a replication system uses to process and distribute the log records, and interact with replication destination servers. Alternatively, in a Multi-Path Replication, Single Scanner (MPR-SS) configuration as illustrated in FIG. 2, there is a single scanner thread responsible for scanning the log and generating LTL, while there are multiple senders to interact with the replication destination servers. As noted, both the ASE and MPR-SS configurations suffer from performance bottleneck due to the sequential nature of the single scanner thread. A person of skilled in the art would recognize that LTL is an example of the language that the replication system uses to process and distribute replicated transactions throughout the replication system. Other communication languages may be used by the replication system to communicate with the primary database and the replication destination servers, and distribute log records to be replicated to the destination servers.

For example, when the number of replication paths is increased, the amount of LTL or other communication language that needs to be copied increases, which generates extra memory copies across all sender thread buffers for the replication paths. Consequently, the overhead generated by the excessive memory copies may delay the work needed for scanning the LTL or communication language generation. Further, even with the multiple replication paths, there is no true support for priority transactions due to the sequential nature of the single scanner thread.

In contrast, a Multi-Path Replication Multi-Scanner (MPR-MS) configuration may be designed to address the limitations noted above. In an embodiment, in a Multi-Path Replication Multi-Scanner (MPR-MS) configuration, one scanner thread is assigned to a defined replication path corresponding to a replication destination server, which has a one to one to one mapping. Alternatively, a plurality of seamier threads may be assigned to a defined replication path corresponding to a replication destination server, which has a many to one to one mapping.

In one embodiment, the MPR-MS configuration may spawn as many scanner threads as the number of the replication paths are defined. There may be an association between a scanner thread and a replication path upon startup. The scanner thread may load the data associations and bindings to the replication path that the scanner thread is tasked to work for. In an embodiment, the object bindings for a replication may determine the amount of log records to be scanned and transformed into LTL or any other communication language, which increases the overall throughput for the replication path, as illustrated below.

For a scanner thread, data selector 430 selects data from a subset of the transaction log bound to a replication path associated with the scanner thread. In an embodiment, data selector 430 may be the scanner thread. The scanner thread may filter out log records based on the object bindings defined for a path. For example, a user defines two replication paths P1 and P2 for replication destinations located in New York and London, respectively. In determining the subset of the log records to be replicated for replication path P1, scanner thread may select modified data in the transaction logs that is target to New York only and ignore all other log records. Data selector 430 may further transform the filtered log records into LTL commands or other communication language commands, and communicate to replication destination server in New York via replication path P1.

In another embodiment, data selector 430 may allow a dedicated replication path to work with priority transactions, because, under the MPR-MS configuration, the LTL generation process is independent from the other transactions that already stored in the transaction log. In still another embodiment, the multiple scanner threads may afford better usage of the replication engine, such as an ASE threaded kernel. In still another embodiment, multiple scanner threads may implement delayed transactions and avoid sending empty begin or commit transactions across the replication paths. In still another embodiment, a data queue is defined for each replication path and the scanner thread is responsible to populate the data queue with the log records selected for the specific replication path.

Data distributor 440 distributes the data to a destination server associated with the replication path. In an embodiment, data distributor may be a sender thread as illustrated in FIG. 3. Each replication path may have a dedicated sender thread. For example, the sender thread may retrieve data or LTL or other communication language message from the data queue and communicates with the replication destination associated with the replication path.

As noted, the LTL generation throughput for each scanner thread is improved for the MPR-MS configuration, compared to that of the single scanner configuration, according to an embodiment. For example, under the MPR-MS configuration and in a uniform distribution of the workload, each scanner thread may read less qualifying log records and generate less LTL or other communication language. Further, there may be a reduction in the number of memory operations per scanner. Specifically, the memory operations may be optimized, given there is a single target buffer for the LTL or other communication language, and bigger blocks may be written to memory to reduce the number of memory operations.

Embodiments of the elements of MPR-MS engine 115 in FIG. 4, as described herein, may be further configured to run in parallel. Such parallel execution of these elements would increase the efficiency and speed of MPR-MS engine 115.

Method

Figure 5:
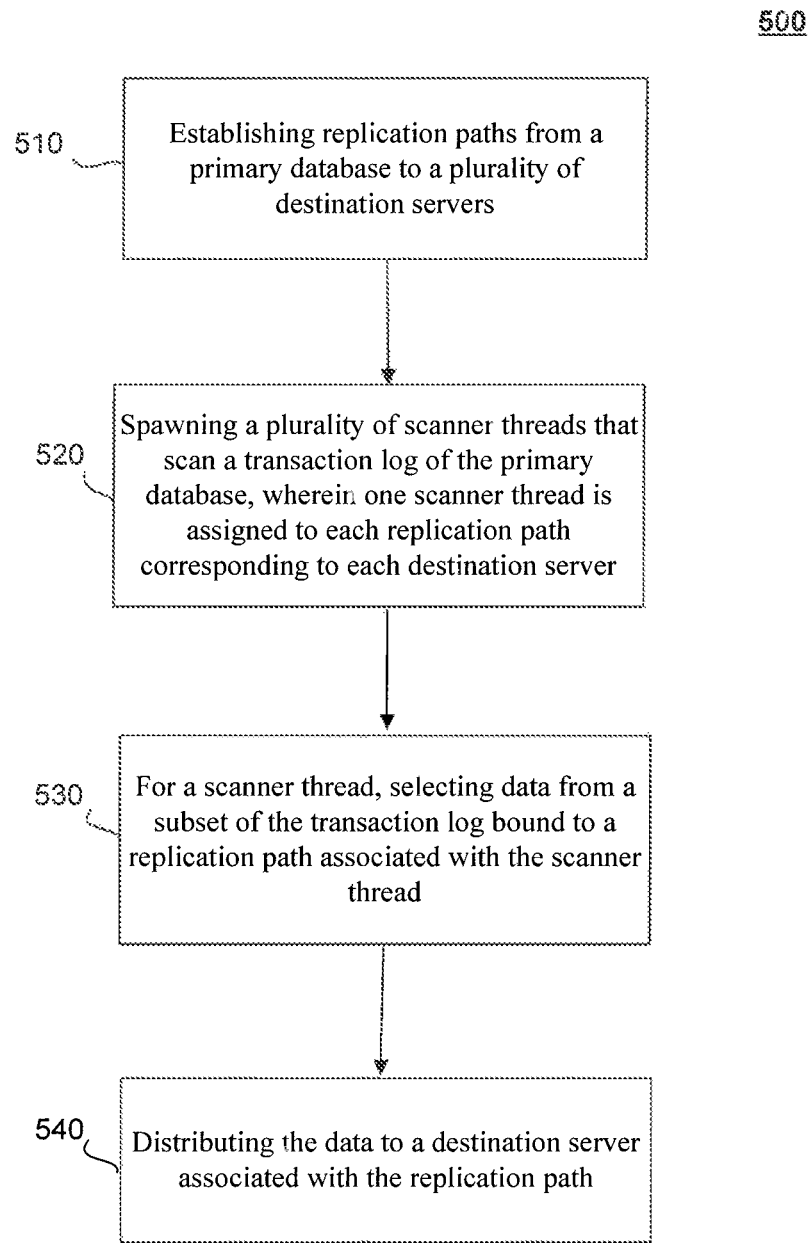
FIG. 5 is a flowchart for a method for implementing parallel scanners for log based replication, according to an embodiment.

FIG. 5 is a flowchart for a method for implementing parallel scanners for log based replication, according to an embodiment. For ease of explanation, method 500 will be described with respect to MPR-MS engine 115 of FIG. 4, as described above. However, method 500 is not intended to be limited thereto.

At stage 510, replication paths are established from a primary database to a plurality of destination servers. For example, path establisher 410 establishes replication paths from a primary database to the destination servers.

At stage 520, a plurality of scanner threads are spawned to scan a transaction log of the primary database. Specifically, one scanner thread maybe assigned to each replication path corresponding to each destination server. For example, scanner creator 410 spawn a plurality of scanner threads to scan a transaction log of the primary database.

According to an embodiment, a default replication path is defined and a default scanner thread is reserved to process unspecified data which none of other replication paths is tasked to process and deliver.

According to another embodiment, a priority transaction may be handled using one or more dedicated paths. For example, a priority replication path may be defined and a dedicated scanner thread is reserved for priority transactions independent from data associated with other paths. A priority transaction maybe a transaction that can benefit from one or more dedicated scanner threads for the replication path the objects bound to, because the objects are part of the transaction and its bindings. The scanner thread may work solely for the specific replication path it bound to.

According to still another embodiment, a load balancing mechanism may be implemented, where the workload on the scanner threads is allocated based on performance characteristics of the replication path. For example, a "fast" replication path may be implemented using two seamier threads and a "slow" replication path may share a scanner thread with another "slow" replication path. In another example, a fast replication path is defined, where a larger number of scanner threads are assigned for the fast replication path, than that assigned to a non-fast replication path.

According to still another embodiment, multiple scanner threads are assigned for a single replication path. According to still another embodiment, internal object related structures are built to process the data associated with the replication path that the scanner thread works for.

At stage 530, for a scanner thread, data bound to a replication path associated with the scanner thread is selected from a subset of the transaction log. For example, data selector 230 selects data bound to a replication path from a subset of the transaction log.

According to an embodiment, all log data may be read by each scanner thread and each scanner thread may filter the log data to process only data associated with the Specified replication path based on the object binding defined by the user.

According to another embodiment, log records in the transaction log are filtered out based on data binding defined for the replication path associated with the scanner thread, and the log records not associated with the scanner thread are ignored by the scanner thread working for the replication path. In another embodiment, LTL or other communication language commands are generated based on the data selected from the subset of the transaction log.

At stage 540, data is distributed to a destination server associated with the replication path. For example, data distributor 440 distributes the data to a destination server associated with the replication path.

In an embodiment, data is distributed to the destination server associated with the replication path using a sender thread, and the sender thread is dedicated to distributing the data across the replication path to the destination server.

In another embodiment, because each sender-thread has its own scanner thread, its performance may not be influenced by activities generated by other replication paths. For example, the sender thread may not have to sleep on empty data queue, which occurs under a single scanner configuration and the single scanner is preoccupied executing work for another replication path.

In still another embodiment, although introducing multiple scanner threads may generate additional reads over the transaction log, the time spent on the additional reads may be compensated by the increased throughput of the overall replication system. Indeed, scanning the transaction log may be a process that is much faster than sending the same data across the network towards multiple external replication destinations.

Example Computer System Implementation

Embodiments shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
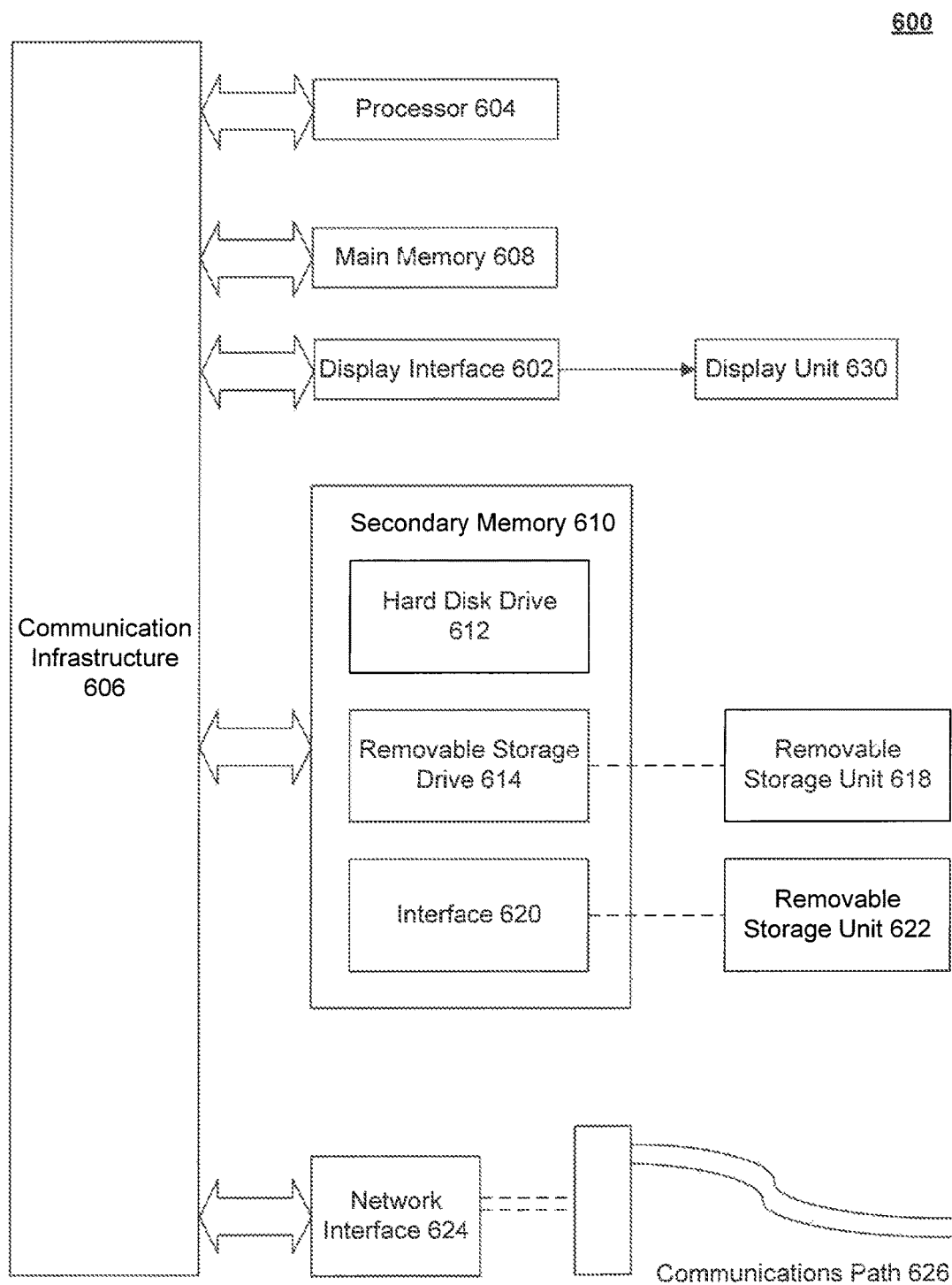
FIG. 6 is a diagram of an example computer system in which embodiments can be implemented.

FIG. 6 illustrates an example computer system 600 in which embodiments, or portions thereof, may be implemented as computer-readable code. For example, MPR-MS engine 115, including its components, as shown in FIG. 4, can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 600. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or mufti-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 6600 may also include a network interface 624. Network interface 524 allows software and data to be transferred between computer system 600 and external devices. Network interface 624 may include a modem, a network interface (such as an Ethernet card), a communications port, a PCMCIA slot and card, or the like. Software and data transferred via network interface 624 may be in the form of signals, which may be electronic, electromagnetic, optical, or other signals capable of being received by network interface 624. These signals may be provided to network interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 410, which may be memory semiconductors (e.g. DRAMs, etc.).

Computer programs (also called computer control logic) are stored in main memory 608 and/or secondary memory 610. Computer programs may also be received via network interface 624. Such computer programs, when executed, enable computer system 600 to implement embodiments as discussed herein. In particular, the computer programs, when executed, enable processor device 604 to implement the processes of embodiments of the present invention, such as the stages in the methods illustrated by flowchart 500 of FIG. 5, discussed above. Accordingly, such computer programs represent controllers of the computer system 600. Where embodiments are implemented using software, the software may be stored in a computer program product and loaded into computer system 600 using removable storage drive 614, interface 620, and hard disk drive 612, or network interface 624.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for data replication, comprising:

establishing a first replication path from a primary database to a first destination server and a second replication path from the primary database to a second destination server;

spawning a first scanner thread and a second scanner thread, wherein the first and second scanner threads scan one or more log records in a transaction log of the primary database, the first scanner thread mapped to the first replication path and the second scanner thread mapped to the second replication path, wherein the first scanner threads selects data from the transaction log for the first replication path, and the second scanner thread selects data from the transaction log for the second replication path; and spawning a first sender thread and a second sender thread, wherein the first sender thread is mapped to the first scanner thread and the second sender thread is mapped to the second scanner thread, the first sender thread distributes the data selected by the first scanner thread to the first destination server, the second sender thread distributes the data selected by the second scanner thread to the second destination server, and the first and second sender threads distribute the selected data in parallel to the first and second destination servers.

2. The method of claim 1, wherein the first scanner thread generates first Log Transfer Language (LTL) commands based on the data selected by the first scanner thread, and the second scanner thread generates second LTL commands based on the data selected by the second scanner thread.

3. The method of claim 1, wherein the first scanner thread filters out log records in the transaction log based on a first data binding defined for the first replication path, and the second scanner thread filters out log records in the transaction log based on a second data binding defined for the second replication path.

4. The method of claim 1, further comprising:
defining a priority replication path, wherein a dedicated scanner thread is mapped to the priority replication path, and the dedicated scanner thread is reserved for selecting priority data from the transaction log for the priority replication path.

5. The method of claim 1, further comprising:
defining a default replication path, wherein a default scanner thread is mapped to the default replication path, and the default scanner thread is reserved for selecting unspecified data from the transaction log for the default replication path.

6. The method of claim 1, further comprising:
implementing a load balancing mechanism among the first and second scanner threads based on path performance characteristics of the first and second replication paths.

7. The method of claim 6, further comprising:
defining a fast replication path, wherein a larger number of scanner threads are assigned to the fast replication path than are assigned to a non-fast replication path.

8. The method of claim 1, further comprising:
assigning a plurality of scanner threads to a single replication path.

9. The method of claim 1,
wherein the first sender thread is dedicated to distributing the data selected by the first scanner thread across the first replication path, and the second sender thread is dedicated to distributing the data selected by the second scanner thread across the second replication path.

10. The method of claim 1, further comprising:
building a first internal object related structure, wherein the first scanner thread uses the first internal object related structure to process log records in the transaction log associated with the first replication path; and
building a second internal object related structure, wherein the second scanner thread uses the second internal object related structure to process log records in the transaction log associated with the second replication path.

11. The method of claim 1, further comprising:
assigning a plurality of replication paths to a plurality of destination servers in a one-to-one mapping.

12. The method of claim 1, wherein the first replication path is associated with a portion of the transaction log based on an object binding.

13. A system for memory management, comprising:
one or more processors;
a path establisher, configured to establish, using the one or more processors, a first replication path from a primary database to a first destination server and a second replication path from the primary database to a second destination server;
a scanner creator, configured to:
spawn, using the one or more processors, a first scanner thread and a second scanner thread, wherein the first and second scanner threads scan one or more log records in a transaction log of the primary database, the first scanner thread mapped to the first replication path and the second scanner thread mapped to the second replication path, wherein the first scanner threads selects data from the transaction log for the first replication path, and the second scanner thread selects data from the transaction log for the second replication path; and
a data distributor, configured to:
spawn, using the one or more processors, a first sender thread and a second sender thread, wherein the first sender thread is mapped to the first scanner thread and the second sender thread is mapped to the second scanner thread, the first sender thread distributes the data selected by the first scanner thread to the first destination server, the second sender thread distributes the data selected by the second scanner thread to the second destination server, and the first and second sender threads distribute the selected data in parallel to the first and second destination servers.

14. The system of claim 13, further comprising:
a command generator, configured to generate, using the one or more processors, first Log Transfer Language (LTL) commands based on the data selected by the first scanner thread, and second LTL commands based on the data selected by the second scanner thread.

15. The system of claim 13, further comprising:
a log filter, configured to filter out, using the one or more processors, first log records in the transaction log based on a first data binding defined for the first replication path, and second log records in the transaction log based on a second data binding defined for the second replication path.

16. The system of claim 13, further comprising:
a path definer, configured to define, using the one or more processors, a priority replication path, wherein a dedicated scanner thread is mapped to the priority replication path, and the dedicated scanner thread is reserved for selecting priority data from the transaction log for the priority replication path.

17. The system of claim 13, further comprising:
a path definer, configured to define, using the one or more processors, a default replication path, wherein a default scanner thread is mapped to the default replication path, and the default scanner thread is reserved for selecting unspecified data from the transaction log for the default replication path.

18. The system of claim 13, further comprising:
a load balancer, configured to implement, using the one or more processors, a load balancing mechanism among the first and second scanner threads based on path performance characteristics of the first and second replication paths.

19. The system of claim 18, further comprising:
a path definer, configured to define, using the one or more processors, a fast replication path, wherein a larger number of scanner threads are assigned to the fast replication path than are assigned to a non-fast replication path.

20. The system of claim 13, further comprising:
a thread assigner, configured to assign, using the one or more processors, a plurality of scanner threads to a single replication path.

21. The system of claim 13, wherein
wherein the first sender thread is dedicated to distributing the data selected by the first scanner thread across the first replication path, and the second sender thread is dedicated to distributing the data selected by the second scanner thread across the second replication path.

22. The system of claim 13, further comprising:
an object builder, configured to build, using the one or more processors, first and second internal object related structures, wherein the first scanner thread uses the first internal object related structure to process log records in the transaction log associated with the first replication path, and the second scanner thread uses the second internal object related structure to process log records in the transaction log associated with the second replication path.

23. The system of claim 13, further comprising:
assigning a plurality of replication paths to a plurality of destination servers in a one-to-one mapping.

24. A computer program product comprising a non-transitory computer readable storage medium having instructions encoded thereon that, when executed by a processor, cause the processor to perform operations comprising:
establishing a first replication path from a primary database to a first destination server and a second replication path from the primary database to a second destination server;
spawning a first scanner thread and a second scanner thread, wherein the first and second scanner threads scan one or more log records in a transaction log of the primary database, the first scanner thread mapped to the first replication path and the second scanner thread mapped to the second replication path, wherein the first scanner threads selects data from the transaction log for the first replication path, and the second scanner thread selects data from the transaction log for the second replication path; and
spawning a first sender thread and a second sender thread, wherein the first sender thread is mapped to the first scanner thread and the second sender thread is mapped to the second scanner thread, the first sender thread distributes the data selected by the first scanner thread to the first destination server, the second sender thread distributes the data selected by the second scanner thread to the second destination server, and the first and second sender threads distribute the selected data in parallel to the first and second destination servers.

25. The computer program product of claim 24, wherein the instructions further cause the processor to perform operations comprising:
assigning a plurality of replication paths to a plurality of destination servers in a one-to-one mapping.

\* \* \* \* \*